United States Patent
Yamagishi

(10) Patent No.: US 10,530,710 B2
(45) Date of Patent: Jan. 7, 2020

(54) CONTENT SUPPLY DEVICE, CONTENT SUPPLY METHOD, PROGRAM, TERMINAL DEVICE, AND CONTENT SUPPLY SYSTEM

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 103 days.

(21) Appl. No.: 14/897,463

(22) PCT Filed: Jul. 8, 2014

(86) PCT No.: PCT/JP2014/068125
§ 371 (c)(1),
(2) Date: Dec. 10, 2015

(87) PCT Pub. No.: WO2015/008653
PCT Pub. Date: Jan. 22, 2015

(65) Prior Publication Data
US 2016/0142339 A1    May 19, 2016

(30) Foreign Application Priority Data
Jul. 17, 2013 (JP) .................................. 2013-148212

(51) Int. Cl.
*H04L 12/931* (2013.01)
*H04L 29/08* (2006.01)

(52) U.S. Cl.
CPC ............ *H04L 49/201* (2013.01); *H04L 67/06* (2013.01)

(58) Field of Classification Search
CPC ....... H04L 12/18; H04L 65/60; H04L 67/108; H04L 49/201; H04L 65/4092;
(Continued)

(56) References Cited

U.S. PATENT DOCUMENTS

2011/0080940 A1    4/2011    Bocharov et al.
2011/0302618 A1*   12/2011   Odlund .............. H04N 21/2183
                                                              725/109

(Continued)

FOREIGN PATENT DOCUMENTS

CN    1666514 A    9/2005
CN    1765130 A    4/2006
(Continued)

OTHER PUBLICATIONS

ISO/IEC 14496-12, original publication 2003, current 5th edition 2015, pp. 1-94.*

(Continued)

*Primary Examiner* — Jerry B Dennison
(74) *Attorney, Agent, or Firm* — Oblon, McClelland, Maier & Neustadt, L.L.P.

(57) ABSTRACT

The present disclosure relates to a content supply device, a content supply method, a program, a terminal device, and a content supply system that make it possible to transmit a file transmission unit of a segment stream without delay. According to the present disclosure, there is provided a content supply device that multicast-delivers a fragment stream of content, the content supply device including: a fragment stream generating unit configured to generate the fragment stream based on source data of the content; and a delivering unit configured to generate a file transmission unit in units of second data units by delimiting the generated fragment stream into first data units that are randomly accessible and subdividing the first data unit into the second data units and FLUTE-multicast-deliver the file transmission unit. The present disclosure can be applied to a system in which content is FLUTE-multicast-delivered.

18 Claims, 13 Drawing Sheets

(58) Field of Classification Search
CPC ........... H04N 21/8456; H04N 21/2353; H04N 21/85406; H04N 21/234; H04N 21/2365; H04N 21/845; H04W 72/005
USPC .......................................................... 709/217
See application file for complete search history.

(56) References Cited

U.S. PATENT DOCUMENTS

| | | | | |
|---|---|---|---|---|
| 2012/0239785 | A1* | 9/2012 | Pazos .................. | H04L 12/1881 709/219 |
| 2013/0060956 | A1 | 3/2013 | Nagaraj et al. | |
| 2013/0091251 | A1* | 4/2013 | Walker ............... | H04N 21/6125 709/219 |
| 2013/0194996 | A1* | 8/2013 | Oyman ................. | H04W 4/70 370/312 |
| 2014/0032777 | A1 | 1/2014 | Yuan et al. | |
| 2014/0095668 | A1* | 4/2014 | Oyman ................. | H04W 4/70 709/219 |
| 2014/0115647 | A1* | 4/2014 | Kim ................. | H04N 21/23439 725/110 |
| 2016/0255133 | A1 | 9/2016 | Nagaraj et al. | |
| 2016/0295297 | A1* | 10/2016 | Yamagishi ......... | H04N 21/6405 |

FOREIGN PATENT DOCUMENTS

| | | |
|---|---|---|
| CN | 102232298 A | 11/2011 |
| CN | 102577272 A | 7/2012 |
| CN | 103119934 A | 5/2013 |
| WO | WO 2013/052780 A1 | 4/2013 |

OTHER PUBLICATIONS

ISO/IEC 14496-12 5th edition of MPEG-4 Standard, first published 2003 by MPEG 111—Geneva, 239 pages (Year: 2003).*
RFC 6726, "FLUTE—File Delivery over Unidirectional Transport"; IETF; ISSN: 2070-1721; Nov. 2012; 46 pages (Year: 2012).*
International Search Report dated Oct. 7, 2014 in PCT/JP2014/068125.
Mitsuhiro Hirabayashi, "Realizing the Uninterrupted Video Distribution in the Existing Web Server , An Exposition on "MPEG-DASH", the Next-Generation Standard of Video Distribution", NIKKEI Electronics, Mar. 19, 2012, pp. 77-85 (with English Translation).
Extended European Search Report dated Dec. 12, 2016 in Patent Application No. 14826357.7.
Thomas Stockhammer, "Technologies under Consideration for ISO/IEC 23009-1 Dynamic Adaptive Streaming over HTTP", Systems Subgroup , International Organisation for Standardisation, ISO/IEC JTC1/SC29/WG11 MPEG2011/N12682, XP030019156A, Nov. 2011, 18 pages.
Chinese Office Action dated Apr. 10, 2019 in Application No. 2014800389573 (with English translation), 11 pages.
Chinese Search Report issued in Application No. 2014800389573 (with English translation), 4 pages.
Chinese Second Office Action dated Sep. 20, 2018 in CN Application No. 201480038957.3 with English translation, 8 pages.

* cited by examiner

FIG.9

A
```
aligned(8) class MovieFragmentHeaderBox extends FullBox( 'mfhd' , 0, 0) {
    unsigned int(32) sequence_number;
}
```

B
```
aligned(8) class MovieFragmentHeaderBox extends FullBox( 'mfhd' , 1, 0) {
    unsigned int(32) sequence_number;
    unsigned int(32) version;
}
```

C
```
Aligned(8) class MovieFragmentHeaderBox extends FullBox( 'mfhd' , frmtVersion, 0) {
    unsigned int(32) sequence_number;
    if (frmtVersion = 1) {
        unsigned int(32) version;
    }
}
```

FIG. 10

NTP Time Box

Definition:

Box Type: 'ntpt'
  Container: Track Fragment box ( 'traf' )
  Mandatory: No
  Quantity: Zero or one NTP Time Box provides the NTP time corresponding to decode time of the first sample in the track fragment. The NTP Time Box, if present, shall be positioned after the Track Fragment Header Box and before the first Track Fragment Run box.

Syntax:

```
aligned(8) class NTPTimeBox extends FullBox( 'ntpt' , version, 0) {
  if (version==1) {
    int(128) NTPTime;
  } else { // version==0
    int(64) NTPTime;
}
```

Semantics:

version is an integer that specifies the version of this box (0 or 1 in this specification).
  NTPTime is an integer equal to the sum of the decode durations of all earlier
samples in the media, expressed in the media's timescale. It does not include the samples
added in the enclosing track fragment.

CONTENT SUPPLY DEVICE, CONTENT SUPPLY METHOD, PROGRAM, TERMINAL DEVICE, AND CONTENT SUPPLY SYSTEM

TECHNICAL FIELD

The present disclosure relates to a content supply device, a content supply method, a program, a terminal device, and a content supply system, and more particularly, to a content supply device, a content supply method, a program, a terminal device, and a content supply system, which are suitably used when streaming data of content is delivered according to file delivery over unidirectional transport (FLUTE).

BACKGROUND ART

Moving Picture Experts Group-Dynamic Adaptive Streaming over HTTP (hereinafter, referred to as "DASH") (MPEG-DASH) using the same HTTP as browsing of a web site as an internationally standardized moving image delivery protocol available for moving image delivery via the Internet has been known (for example, see Non-Patent Literature 1).

In DASH, an adaptive streaming technique is implemented. In other words, a content supply side is configured to prepare a plurality of streams that include content of the same subject and differ in a bit rate according to a difference in image quality, an angle of view size, or the like. On the other hand, the reception side can select an optimal stream among the plurality of streams prepared by the supply side according to a communication environment of the Internet, a decoding capability of the reception side, or the like and acquire and reproduce the selected optimal stream.

Further, a metafile called a media presentation description (MPD) is supplied from the supply side to the reception side so that the reception side can adaptively select and acquire a stream.

An address (url information) of a server (a supply source) that supplies streaming data (media data such as audio/video/subtitles) of content divided into chunks to the reception side is described in the MPD. The reception side can access a server serving as a content supply source based on the url information, request streaming data, and receive and reproduce streaming data HTTP-unicast-delivered from the server according to the request.

FIG. 1 illustrates an example of a configuration of a content supply system that delivers content in a streaming manner based on the DASH.

A content supply system 10 includes a plurality of content supply devices 20 that supply content and a plurality of DASH clients 30 that receive and reproduce content. The DASH client 30 can be connected to the content supply device 20 via a content delivery network (CDN) 12 using the Internet 11.

The content supply device 20 delivers a plurality of streams that include content of the same subject and differ in a bit rate. The content supply device 20 includes a channel streamer 21, a DASH segment streamer 22, and a DASH MPD server 23.

The channel streamer 21 manages source data of content to be delivered to the DASH client 30, generates a plurality of pieces of streaming data having different bit rates from the source data, and outputs the plurality of pieces of streaming data to the DASH segment streamer 22.

The DASH segment streamer 22 generates, for example, segment streams such as a fragmented MP4 by temporally dividing each piece of streaming data into segments, and holds the generated segment streams as files. Further, the DASH segment streamer 22 HTTP-unicast-delivers the file of the held segment stream to a request source in response to a request (a HTTP request) from the DASH client 30 as a web server. The DASH segment streamer 22 notifies the DASH MPD server 23 of metadata including an address indicating the supply source of the file of the segment stream.

The DASH MPD server 23 generates the MPD in which, for example, the address indicating the supply source (that is, the DASH segment streamer 22) of the file of the segment stream is described. The DASH MPD server 23 HTTP-unicast-delivers the generated MPD to the request source according to the request (the HTTP request) from the DASH client 30 as the web server.

The DASH client 30 request the DASH MPD server 23 to transmit the MPD, and receives the MPD that is HTTP-unicast-delivered in response to the request. The DASH client 30 requests the DASH segment streamer 22 to transmit the file of the segment stream based on the received MPD, and receives and reproduces the file of the segment stream that is HTTP-unicast-delivered in response to the request.

The CDN 12 includes a cache server (not illustrated), and the cache server caches the MPD or the file of the segment stream that is HTTP-unicast-delivered via the CDN 12. The cache server can HTTP-unicast-deliver the cached MPD or the file of the segment stream to the DASH client 30 of the request source instead of the DASH MPD server 23 serving as the web server or the DASH segment streamer 22.

CITATION LIST

Non-Patent Literature

Non-Patent Literature 1: Mitsuhiro Hirabayashi, "Achieving Uninterrupted Video Streaming Using Existing Web Servers," NIKKEI ELECTRONICS, Mar. 19, 2012

SUMMARY OF INVENTION

Technical Problem

As described above, in DASH, the adaptive streaming technique using the HTTP-unicast delivery is implemented.

If the reception side can receive the stream that is, for example, FLUTE-multicast-delivered or RTP-multicast-delivered as well as the stream that is HTTP-unicast-delivered, it is desirable to deliver the stream using the delivery paths as well and enable the reception side to select the stream adaptively.

In other words, since the FLUTE-multicast delivery and the RTP-multicast delivery guarantee a QoS (for example, a guaranteed band/delay), when content in which a real-time property is necessary such as a live video is delivered, the reception side can be expected to receive and reproduce the stream more stably than in the HTTP-unicast delivery.

Here, a case in which segment streams such as a fragmented MP4 are generated from source data of content captured in real time and then sequentially FLUTE-multicast-delivered will be considered.

FIG. 2 illustrates an overview of a file transmission unit generation method a according to a related art when a fragmented MP4 is FLUTE-delivered.

In other words, when the fragmented MP4 is FLUTE-delivered, a file transmission unit is generated in units of GOPs serving as a minimum unit of the fragmented MP4 that is randomly accessible and FLUTE-multicast-delivered. Practically, there are also cases in which the file transmission unit is generated in integer-multiple units of GOPs, but in this specification, the file transmission unit is assumed to be generated in units of GOPs.

In the example of FIG. 2, data of a GOP range of the fragmented MP4 is assumed to include a sample (s) (1), a sample (s) (2), and a sample (s) (3) chronologically. The file transmission unit is generated after the sample (s) (1) to the sample (s) (3) are generated and then FLUTE-multicast-delivered.

FIG. 3 illustrates a data structure of the file transmission unit according to a related art when the fragmented MP4 is FLUTE-delivered.

The file transmission unit (Media Segment) includes styp, moof, and mdat. moof includes mfhd and traf, and traf includes tfhd, tfdt, trun, and sdtp. sequence_number of the file transmission unit that is sequentially transmitted is stored in mfhd, and BaseMediaDecodeTime-1 of the sample (s) (1) at the head of the GOP unit is stored in tfdt of trail Information necessary to calculate a presentation time of the sample (s) (1) to the sample (s) (3) belonging to the GOP unit is stored in trun of traf. The header of mdat and the sample (s) (1) to the sample (s) (3) are stored in mdat.

FIG. 4 illustrates a timing for transmitting the file transmission unit. A of FIG. 4 illustrates an example in which, for example, a band of a broadcasting network in which the file transmission unit is transmitted is sufficiently large compared to a data amount of the file transmission unit, and in this case, it is possible to bulk-transfer the file transmission unit to the reception side for each GOP without delay.

However, practically, the band of the broadcasting network or the like is not necessarily large enough to be able to bulk-transfer the file transmission unit at once, and the image quality of content and the bit rate of the fragmented MP are expected to increase in the future. In this case, as illustrated in B of FIG. 4, the supply of the file transmission unit may be delayed, this delay may cause a buffering start time of the reception side to be delayed, and thus reproduction of content having a real-time property is negatively affected.

FIG. 5 illustrates an overview of a method of solving the above problem. In other words, in order to solve the above problem, instead of generating and transmitting the file transmission unit after the sample (s) (1) to the sample (s) (3) of each GOP are generated, it is desirable to reduce the size of the file transmission unit and transmit the resulting file transmission units sequentially. However, this method has not been established in the past.

The present disclosure was made in light of the foregoing, and it is desirable to transmit the file transmission unit of the segment stream without delay.

Solution to Problem

According to a first aspect of the present disclosure, there is provided a content supply device that multicast-delivers a fragment stream of content, the content supply device including: a fragment stream generating unit configured to generate the fragment stream based on source data of the content; and a delivering unit configured to generate a file transmission unit in units of second data units by delimiting the generated fragment stream into first data units that are randomly accessible and subdividing the first data unit into the second data units and FLUTE-multicast-deliver the file transmission unit.

The delivering unit can generate the file transmission unit that includes moof in which a version attribute is added to the second data unit of the first data unit of the fragment stream and mdat in which data of the second data unit is stored.

The delivering unit can generate the file transmission unit that includes moof in which styp, a version attribute, and ntpt are added to the second data unit at a head of the first data unit of the fragment stream and mdat in which data of the second data unit is stored, and can generate the file transmission unit including moof and mdat for another second data unit different from the second data unit at the head of the first data unit.

The delivering unit can store a numerical value indicating a version of moof in the version attribute, and store NTP Time-1 corresponding to BaseMediaDecodeTime-1 of the second data unit at the head of the first data unit in the ntpt.

The delivering unit can generate moof of the file transmission unit corresponding to the other second data unit different from the second data unit at the head by copying and updating the moof including the version attribute and the ntpt of the file transmission unit that is previously generated.

According to the first aspect of the present disclosure, there is provided a content supply method of a content supply device that multicast-delivers a fragment stream of content, the content supply method including: a fragment stream generating step of generating, by the content supply device, the fragment stream based on source data of the content; and a delivering step of generating, by the content supply device, a file transmission unit in units of second data units by delimiting the generated fragment stream into first data units that are randomly accessible and subdividing the first data unit into the second data units and FLUTE-multicast-delivering the file transmission unit.

According to the first aspect of the present disclosure, there is provided a program that causes a computer that multicast-delivers a fragment stream of content to function as: a fragment stream generating unit configured to generate the fragment stream based on source data of the content; and a delivering unit configured to generate a file transmission unit in units of second data units by delimiting the generated fragment stream into first data units that are randomly accessible and subdividing the first data unit into the second data units and FLUTE-multicast-deliver the file transmission unit.

In the first aspect of the present disclosure, the fragment stream is generated based on source data of the content, a file transmission unit is generated in units of second data units by delimiting the generated fragment stream into first data units that are randomly accessible and subdividing the first data unit into the second data units, and the file transmission unit is FLUTE-multicast-delivered.

According to a second aspect of the present disclosure, there is provided a terminal device that receives and reproduces content delivered from a content supply device that multicast-delivers a fragment stream of the content, the content supply device including a fragment stream generating unit configured to generate the fragment stream based on source data of the content, and a delivering unit configured to generate a file transmission unit in units of second data units by delimiting the generated fragment stream into first data units that are randomly accessible and subdividing the first data unit into the second data units and FLUTE-multicast-deliver the file transmission unit. The terminal device receives the FLUTE-multicast-delivered file transmission unit, performs buffering until a plurality of the file transmission units corresponding to the first data unit are received, and reproduces the file transmission units in units of the plurality of file transmission units corresponding to the first data unit.

In the second aspect of the present disclosure, the FLUTE-multicast-delivered file transmission unit is received, buffering is performed until a plurality of the file transmission units corresponding to the first data unit are received, and the file transmission units are reproduced in units of the plurality of file transmission units corresponding to the first data unit.

According to a third aspect of the present disclosure, there is provided a content supply system including: a content supply device; and a terminal device that receives and reproduces the content delivered from the content supply device. The content supply device includes a fragment stream generating unit configured to generate the fragment stream based on source data of the content, and a delivering unit configured to generate a file transmission unit in units of second data units by delimiting the generated fragment stream into first data units that are randomly accessible and subdividing the first data unit into the second data units and FLUTE-multicast-deliver the file transmission unit. The terminal device receives the FLUTE-multicast-delivered file transmission unit, performs buffering until a plurality of the file transmission units corresponding to the first data unit are received, and reproduces the file transmission units in units of the plurality of file transmission units corresponding to the first data unit.

In the third aspect of the present disclosure, by the content supply device, the fragment stream is generated based on source data of the content, a file transmission unit is generated in units of second data units by delimiting the generated fragment stream into first data units that are randomly accessible and subdividing the first data unit into the second data units, and the file transmission unit is FLUTE-multicast-delivered. By the terminal device, the FLUTE-multicast-delivered file transmission unit is received, buffering is performed until a plurality of the file transmission units corresponding to the first data unit are received, and the file transmission units are reproduced in units of the plurality of file transmission units corresponding to the first data unit.

Advantageous Effects of Invention

According to the first aspect of the present disclosure, it is possible to transmit the file transmission unit of the segment stream without delay.

According to the second aspect of the present disclosure, it is possible to receive and reproduce a segment stream that is FLUTE-multicast-delivered.

According to the third aspect of the present disclosure, the file transmission unit of the segment stream can be transmitted without delay and then received and reproduced through the terminal device.

BRIEF DESCRIPTION OF DRAWINGS

FIG. 9 is a diagram illustrating an extension of a fragmented MP4 file format specification.

FIG. 10 is a diagram illustrating an extension of a fragmented MP4 file format specification.

DESCRIPTION OF EMBODIMENTS

Hereinafter, preferred modes (hereinafter referred to as embodiments) for carrying out the present disclosure will be described in detail.

[Exemplary Configuration of Content Supply System]

Figure 6:
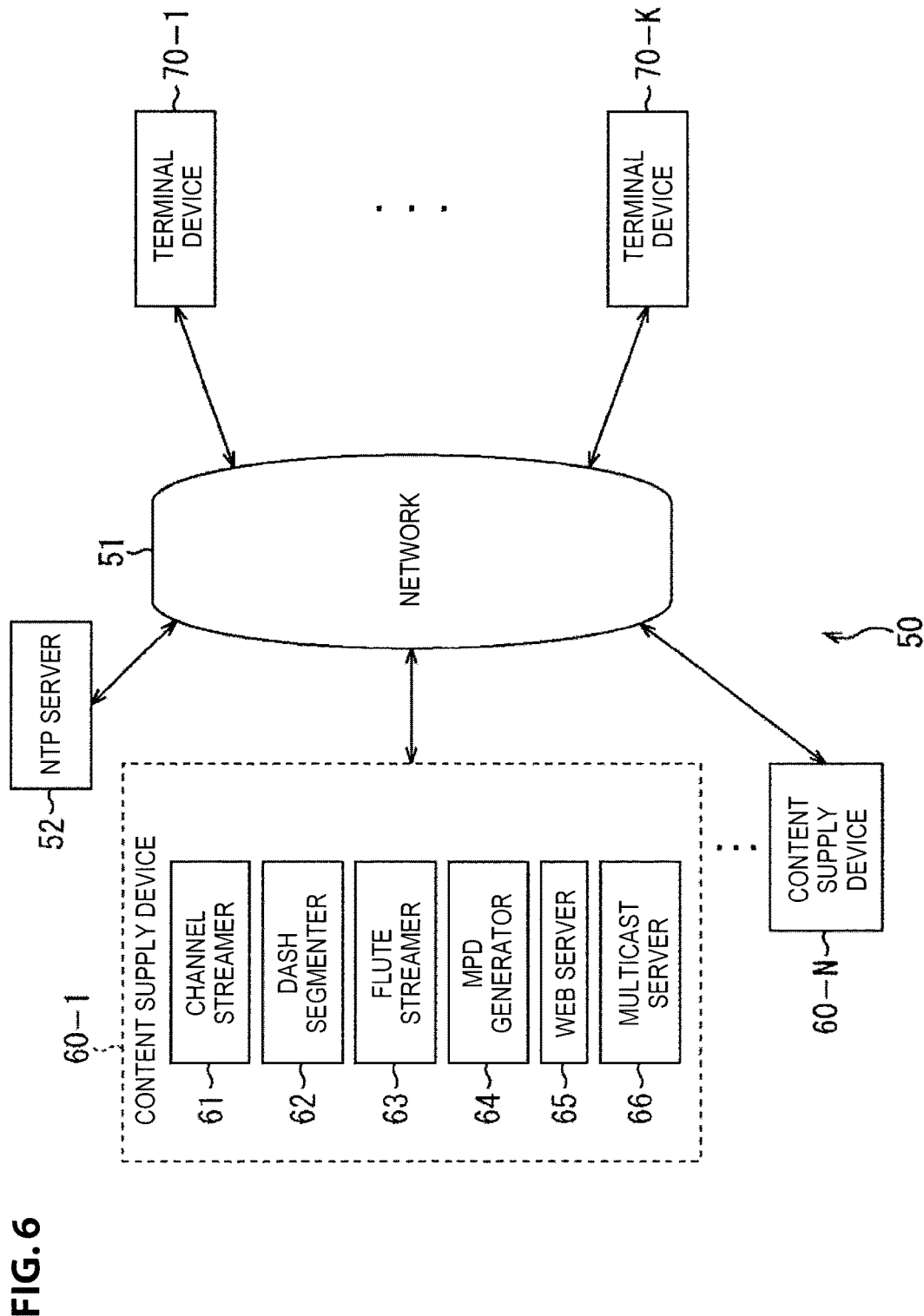
FIG. 6 is a block diagram illustrating an exemplary configuration of a content supply system to which the present disclosure is applied.

FIG. 6 illustrates an exemplary configuration of a content supply system according to an embodiment of the present disclosure.

A content supply system 50 includes a plurality of content supply devices 60 and a plurality of terminal devices 70. The content supply devices 60 can be connected with the terminal devices 70 via a network 51.

The network 51 includes various broadcasting networks using terrestrial broadcasting waves, satellite broadcasting waves, a mobile broadcasting (e)MBMS, or the like in addition to a two-way communication network represented by the Internet and the CDN using the Internet.

An NTP server 52 that provides system time information according to a UTC time format is connected to the network 51. The NTP server 52 can provide the system time information to each of the content supply devices 60, each of the terminal devices 70, and the like, and each of the content supply devices 60 and each of the terminal devices 70 operate in a state in which system time is synchronized with the NTP time axis according to the system time information provided from the NTP server 52.

The content supply devices 60 HTTP-unicast-deliver and FLUTE-multicast-deliver content. The content supply devices 60 include a channel streamer 61, a DASH segmenter 62, a FLUTE streamer 63, an MPD generator 64, a web server 65, and a multicast server 66.

The channel streamer 61 to the multicast server 66 installed in the content supply devices 60 may be integratedly arranged at one position or may be distributedly arranged via the Internet or the like.

The channel streamer 61 generates a plurality of pieces of streaming data having different bit rates which will be delivered to the terminal devices 70 from source data of content captured in real time, and outputs the plurality of pieces of streaming data to the DASH segmenter 62.

The DASH segmenter 62 generates the segment stream such as the fragmented MP4 by temporally dividing each piece of streaming data into segments, and outputs the generated segment stream to the FLUTE streamer 63 and the web server 65. The DASH segmenter 62 notifies the MPD generator 64 of metadata including an address indicating a supply source of the segment stream.

The FLUTE streamer 63 converts the segment streams sequentially input from the DASH segmenter 62 into FLUTE streams, and outputs the FLUTE streams to the multicast server 66 (the details will be described later). The FLUTE streamer 63 stores the MPD generated by the MPD generator 64 in a FLUTE packet, and outputs the resulting FLUTE packet to the multicast server 66.

The MPD generator 64 generates the MPD in which, for example, the address indicating the supply source (the web server 65) of the file of the segment stream is described based on the metadata reported from the DASH segmenter 62, and outputs the generated MPD to the FLUTE streamer 63 and the web server 65.

The web server 65 HTTP-unicast-delivers the MPD input from the MPD generator 64 to the request source according to the request (the HTTP request) for the MPD from the terminal devices 70. The web server 65 HTTP-unicast-delivers the file of the segment stream to the request source according to the request (the HTTP request) for the segment stream from the terminal devices 70.

The multicast server 66 FLUTE-multicast-delivers the MPD. The multicast server 66 FLUTE-multicast-delivers the FLUTE stream.

The terminal devices 70 acquire the MPD from the content supply devices 60 via the network 51. Specifically, the terminal devices 70 transmit the HTTP request, and receive the MPD that is HTTP-unicast-delivered or FLUTE-multicast-delivered in response to the request. The terminal devices 70 request the web server 65 to transmit the segment stream based on the acquired MPD, and receive and reproduce the file of the segment stream that is HTTP-multicast-delivered in response to the request. The terminal devices 70 receive and reproduce the FLUTE-multicast-delivered FLUTE stream. When receiving the MPD or the FLUTE stream that is FLUTE-multicast-delivered, the terminal devices 70 refer to announcement information in which a portal channel of the multicast server 66 that performs the FLUTE-multicast delivery is described.

The announcement information is known through an interaction channel or a broadcast/multicast channel, for example, by a user service description (USD) in the MBMS when the FLUTE-multicast delivery is performed through the mobile broadcasting (e)MBMS included in the network 51. Further, when the FLUTE-multicast delivery is performed through the terrestrial broadcasting waves or the satellite broadcasting included in the network 51, the announcement information is known through the interaction channel or the broadcast/multicast channel, for example, by an electronic service guide (ESG) of DVB-H (IPDC).

[Generation of FLUTE Stream Based on Fragmented MP4]

As described above, in the past, when the fragmented MP4 is FLUTE-delivered, the file transmission end is generated for each GOP and transmitted. In the present embodiment, the file transfer unit is sequentially generated and delivered even in the middle of the GOP.

Figure 7:
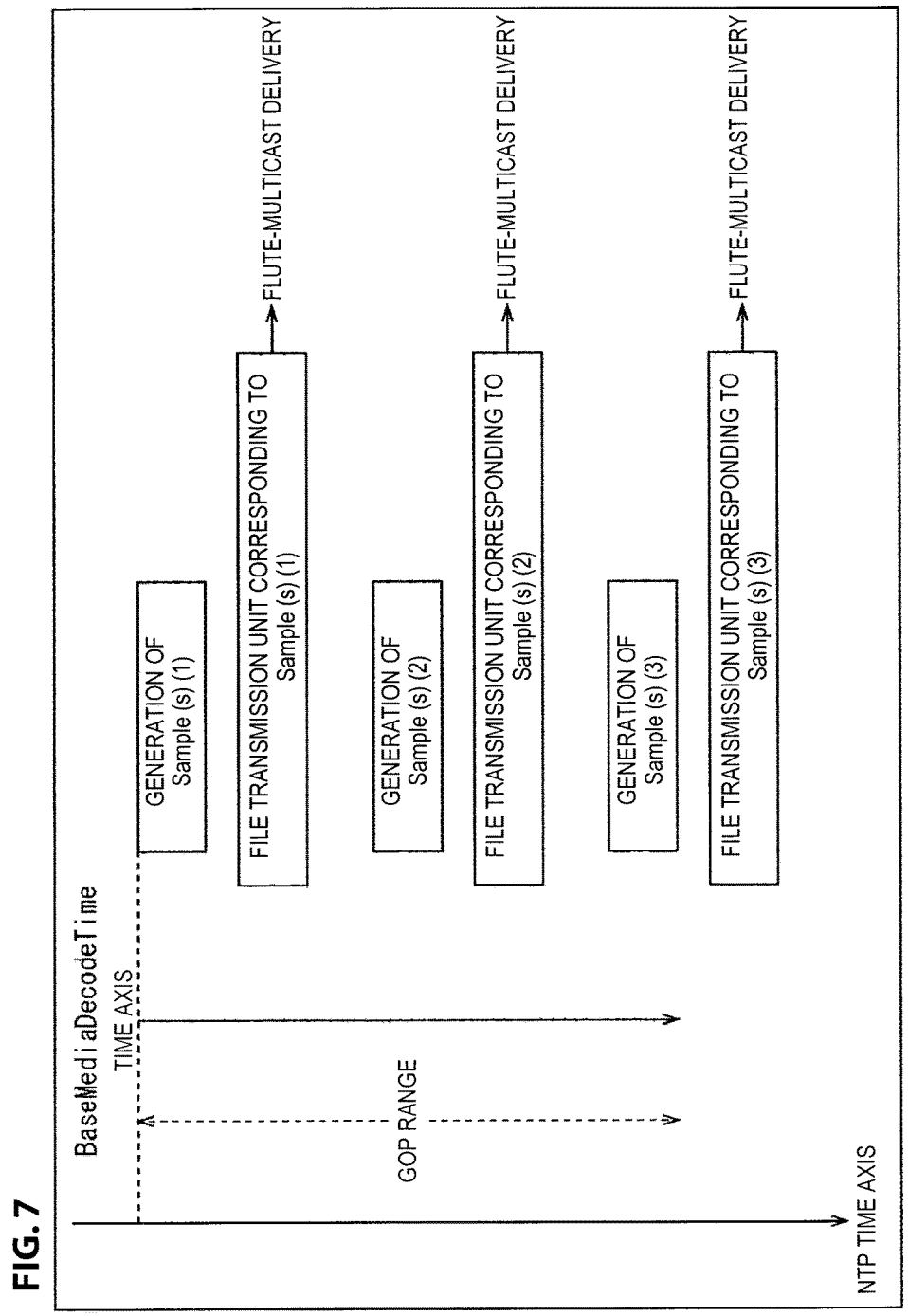
FIG. 7 is a diagram illustrating an overview of a file transmission unit generation method when a content supply device FLUTE-delivers a fragmented MP4.

FIG. 7 illustrates an overview in which the FLUTE streamer 63 generates the file transfer unit of the FLUTE stream from the segment stream of the fragmented MP4 that is sequentially input. In an example of FIG. 7, data of the GOP range of the fragmented MP4 is assumed to include a sample (s) (1), a sample (s) (2), and a sample (s) (3) chronologically.

First, at a stage at which the sample (s) (1) is input, a file transmission unit corresponding to the sample (s) (1) is generated and FLUTE-delivered, and then, at a stage at which the sample (s) (2) is input, a file transmission unit corresponding to the sample (s) (2) is generated and FLUTE-delivered.

At a stage at which the sample (s) (3) is input, a file transmission unit corresponding to the sample (s) (3) is generated and FLUTE-delivered. The terminal devices 70 are assumed to perform decoding at the stage at which the three file transmission units corresponding to the sample (s) (1) to the sample (s) (3) configuring the GOP are received.

Figure 8:
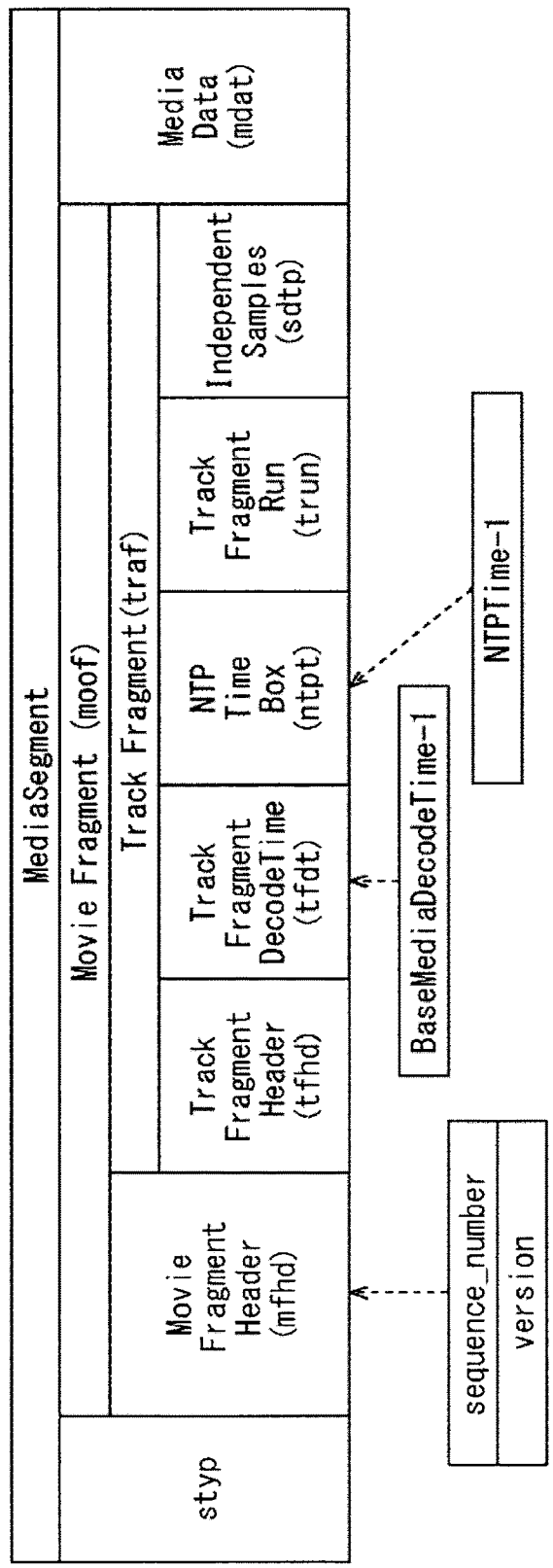
FIG. 8 is a diagram illustrating a data structure when a content supply device FLUTE-delivers a fragmented MP4.

FIG. 8 illustrates a data structure of the file transmission unit generated according to the present embodiment. The file transmission unit (Media Segment) includes styp, moof, and mdat. moof includes mfhd and traf, and traf includes tfhd, tfdt, ntpt, trun, and sdtp.

Figure 1:
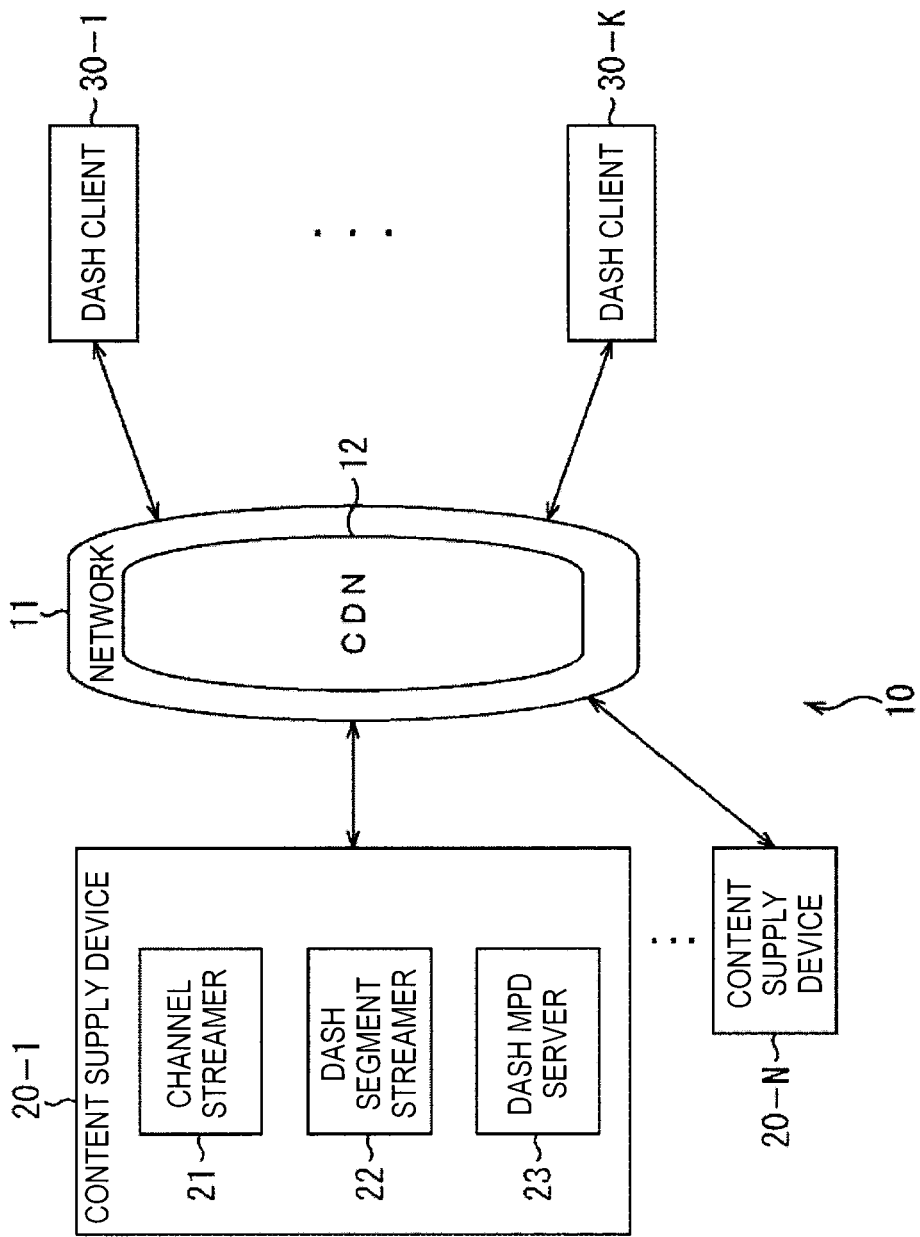
FIG. 1 is a block diagram illustrating an example of a configuration of a content supply system of the related art.
Figure 2:
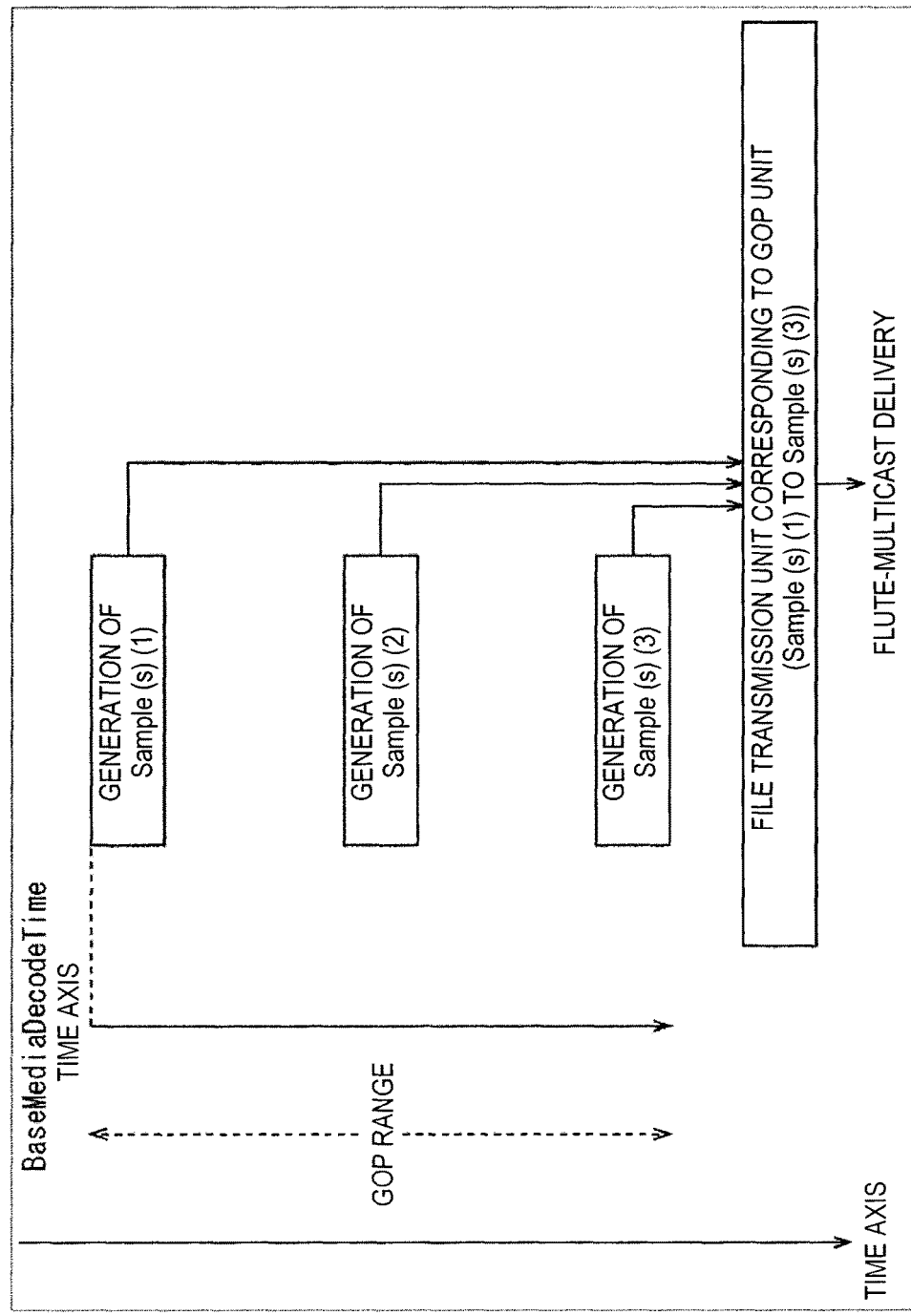
FIG. 2 is a diagram illustrating an overview of a file transmission unit generation method of the related art when a fragmented MP4 is FLUTE-delivered.
Figure 3:
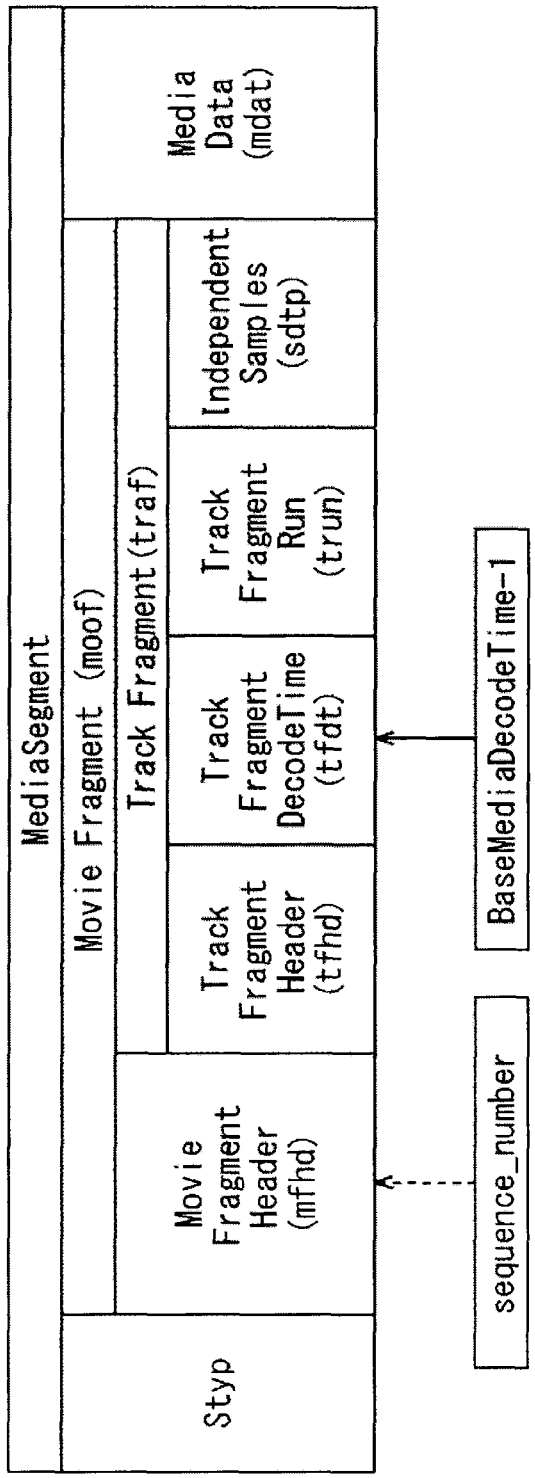
FIG. 3 is a diagram illustrating a data structure of a file transmission unit of the related art when a fragmented MP4 is FLUTE-delivered.
Figure 4:
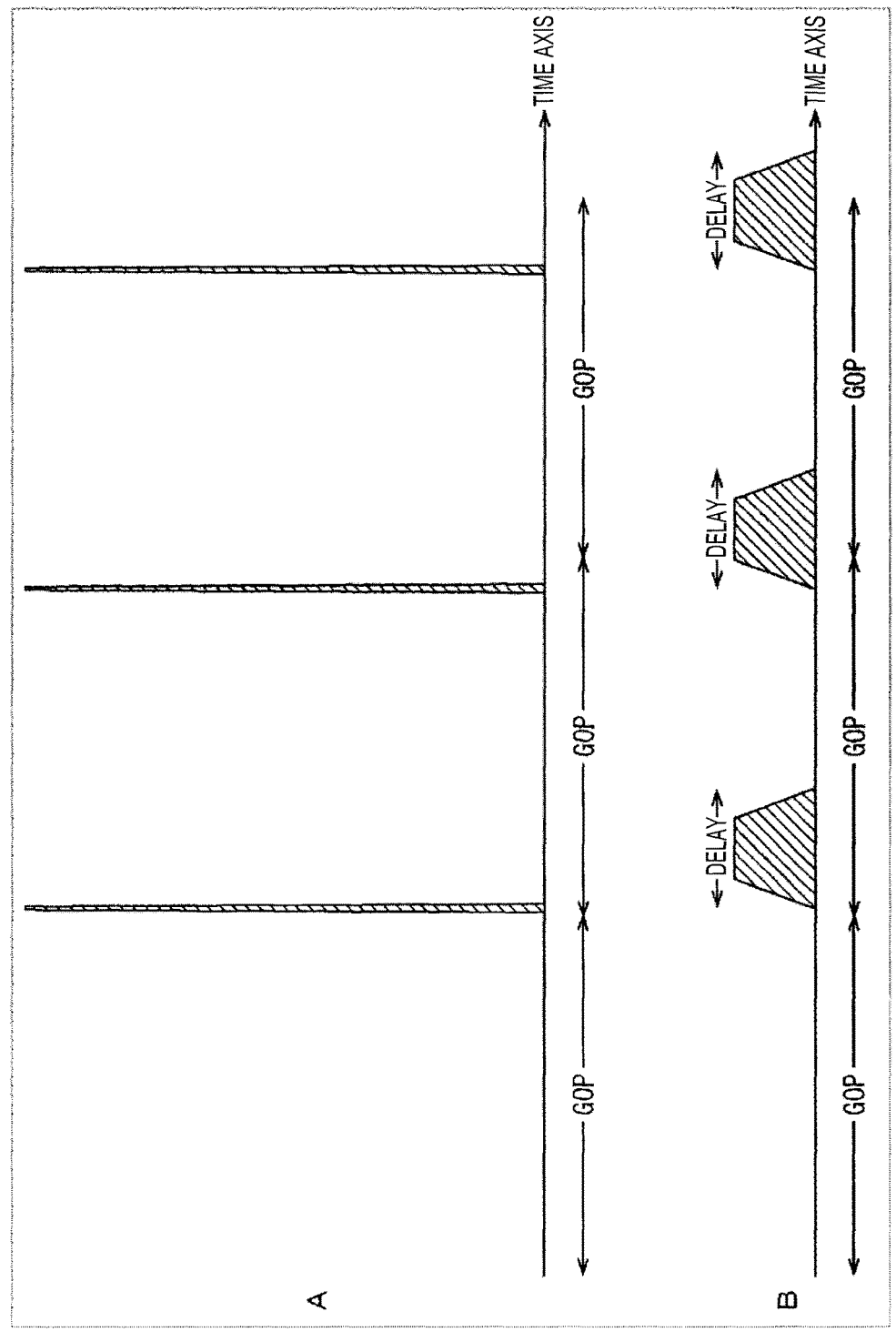
FIG. 4 is a diagram illustrating a transmission timing of a file transmission unit.

As can be seen from a comparison between FIG. 8 and FIG. 3, in the file transmission unit generated according to the present embodiment, a version attribute indicating a version of moof is added to mfhd, compared to the file transmission unit of FIG. 3. NTP Time Box (ntpt) is added to traf of moof. NTP Time-1 corresponding to BaseMediaDecodeTime-1 of the sample (s) (1) at the head of the GOP unit stored in tfdt is stored in ntpt.

The file transmission unit corresponding to the sample (s) (1) includes styp, moof, and mdat, sequence_number and version=1 are stored in moof/mfhd, BaseMediaDecodeTime-1 of the sample (s) (1) is stored in moof/traf/tfdt, and NTP Time-1 corresponding to BaseMediaDecodeTime-1 is stored in moof/traf/ntpt. Further, information necessary for calculating the presentation time of the sample (s) (1) is stored in moof/traf/trun. The header of mdat and the sample (s) (1) are stored in mdat.

In the file transmission unit corresponding to the sample (s) (2), styp is omitted, moof of the file transmission unit corresponding to the sample (s) (1) is copied to moof, a version of moof/mfhd is updated to 2, and information necessary for calculating the presentation time of the sample (s) (2) is added to moof/traf/trun. The sample (s) (2) is stored in mdat.

In the file transmission unit corresponding to the sample (s) (3), styp is omitted, moof of the file transmission unit corresponding to the sample (s) (2) is copied to moof, a version of moof/mfhd is updated to 3, and information necessary for calculating the presentation time of the sample (s) (3) is added to moof/traf/trun. The sample (s) (3) is stored in mdat.

Figure 5:
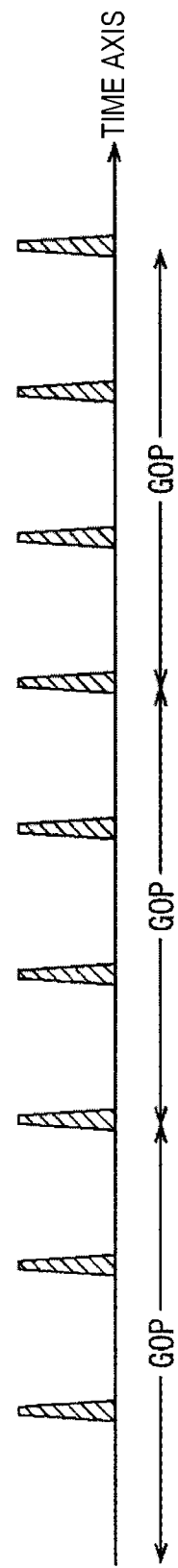
FIG. 5 is a diagram illustrating a transmission timing of a file transmission unit.

When data of the file transmission units corresponding to the sample (s) (1), the sample (s) (2), and the sample (s) (3) is compared, a data amount of moof gradually increases, but a data amount of mdat is substantially the same. Further, when compared with the data amount of the file transmission unit of the GOP unit of the related art, the data amount can be reduced to be almost ⅓, and thus it is possible to further reduce the size of the file transmission unit and sequentially transmit the resulting file transmission unit as illustrated in FIG. 5.

[Extension of Fragmented MP4 File Format Specification]

FIG. 9 illustrates an extension of a fragmented MP4 file format specification for adding the version attribute to moof/mfhd.

In other words, in the present embodiment, extension is performed such that the version attribute is added to the syntax related to sequence_number attribute of moof/mfhd of the related art illustrated in A of FIG. 9 as illustrated in B of FIG. 9. As the version attribute is set, sequence_numbers of moof included in the file transmission units received by the terminal devices 70 are identical, and it is possible to determine whether moof corresponds to only the sample (s) (1) at the head or moof corresponds to the sample (s) (1) to the sample (s) (3), that is, the entire GOP. Further, the fragmented MP4 file format specification may be extended as illustrated in C of FIG. 9 by combining A of FIG. 9 with B of FIG. 9.

FIG. 10 illustrates an extension of a fragmented MP4 file format specification for adding NTP Time Box (ntpt) to moof/traf. As ntpt is set, it is possible to secure the real-time property of content and FLUTE-multicast-deliver the fragmented MP4.

[Operation of Content Supply System 50]

Next, an operation of the content supply system 50 will be described.

Figure 11:
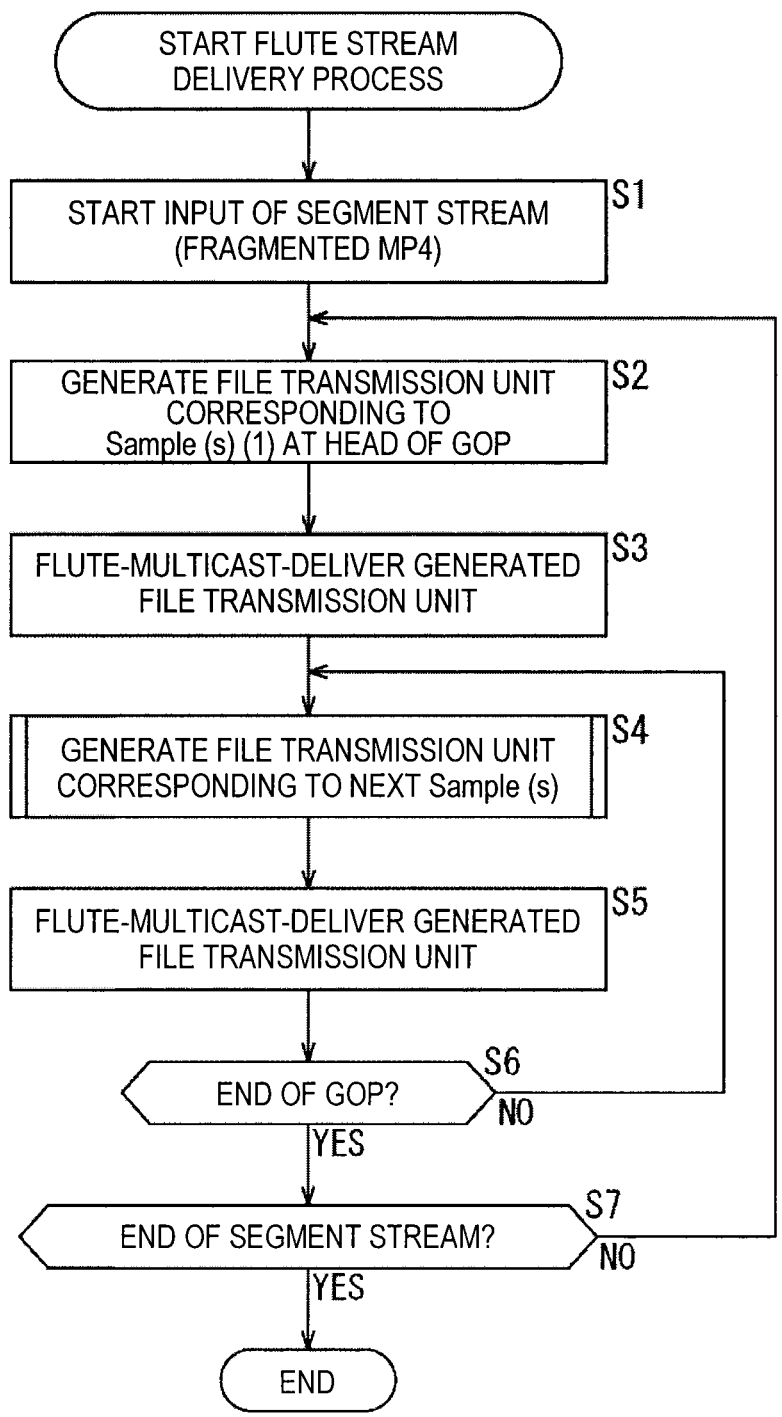
FIG. 11 is a flowchart for describing a FLUTE stream delivery process.

FIG. 11 is a flowchart for describing a process (hereinafter referred to as a "FLUTE stream delivery process") of delivering the FLUTE stream through the content supply devices 60.

In step S1, the channel streamer 61 generates a plurality of pieces of streaming data having different bit rates which will be delivered to the terminal devices 70 from source data of content captured in real time, and outputs the plurality of pieces of streaming data to the DASH segmenter 62. The DASH segmenter 62 generates the fragmented MP4 (the segment stream) based on each piece of streaming data, and outputs the fragmented MP4 (the segment stream) to the FLUTE streamer 63.

In step S2, the FLUTE streamer 63 generates the file transmission unit corresponding to the sample (s) (1) at the head of the GOP of the fragmented MP4 sequentially input from the DASH segmenter 62.

Specifically, styp, moof, and mdat are set as the file transmission unit corresponding to the sample (s) (1), sequence_number and version=1 are stored in moof/mfhd, BaseMediaDecodeTime-1 of the sample (s) (1) is stored in moof/traf/tfdt, and NTP Time-1 corresponding to BaseMediaDecodeTime-1 is stored in moof/traf/ntpt. Further, information necessary for calculating the presentation time of the sample (s) (1) is stored in moof/traf/trun. The header of mdat and the sample (s) (1) are stored in mdat.

In step S3, the multicast server 16 FLUTE-multicast-delivers the file transmission unit corresponding to the sample (s) (1) generated in the process of step S2 via the network 51.

Next, in step S4, the FLUTE streamer 63 generates the file transmission unit corresponding to the next sample (s) (the sample (s) (2) or the sample (s) (3)) of the GOP of the fragmented MP4 sequentially input from the DASH segmenter 62.

Figure 12:
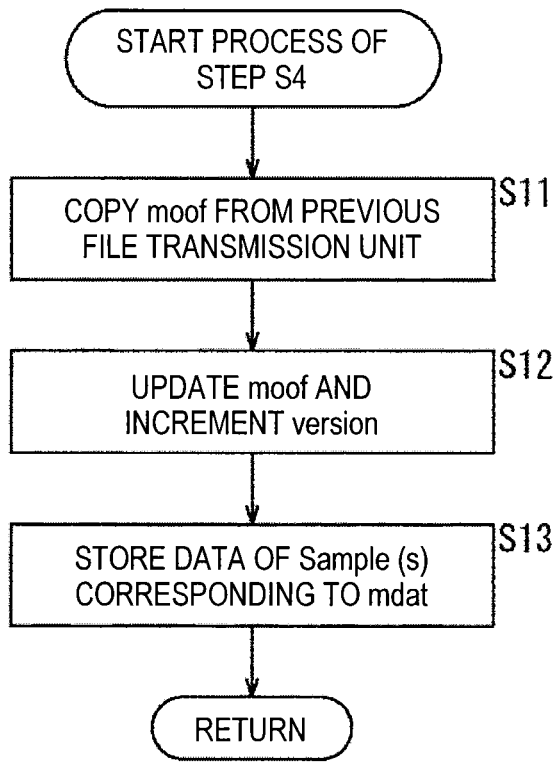
FIG. 12 is a flowchart for describing a process of step S4 of FIG. 11.

The process of step S4 will be described in detail. FIG. 12 is a flowchart for describing the process of step S4 in detail.

When the next sample (s) is the sample (s) (2), in step S11, the FLUTE streamer 63 omits styp, and copies moof from the previous file transmission unit (in this case, the file transmission unit corresponding to the sample (s) (1)). In step S12, the FLUTE streamer 63 updates the version of moof/mfhd to 2. Further, information necessary for calculating the presentation time of the sample (s) (2) is added to moof/traf/trun. In step S13, the FLUTE streamer 63 stores the sample (s) (2) in mdat.

When the next sample (s) is the sample (s) (3), in step S11, the FLUTE streamer 63 omits styp, and copies moof from the previous file transmission unit (in this case, the file transmission unit corresponding to the sample (s) (2)). In step S12, the FLUTE streamer 63 updates the version of moof/mfhd to 3. Further, information necessary for calculating the presentation time of the sample (s) (3) is added to moof/traf/trun. In step S13, the FLUTE streamer 63 stores the sample (s) (3) in mdat.

Referring back to FIG. 11, in step S5, the multicast server 16 FLUTE-multicast-delivers the file transmission unit generated in step S4 via the network 51. In step S6, the FLUTE streamer 63 determines whether or not the file transmission unit generated in step S4 corresponds to the end of the GOP. When the determination result is negative, the process returns to step S4, and step S4 and the subsequent process is repeated. When the determination result of step S6 is positive, the process proceeds to step S7.

In step S7, the FLUTE streamer 63 determines whether or not the input of the fragmented MP4 (the segment stream) from the DASH segmenter 62 has ended. When the determination result is negative, the process returns to step S2, and step S2 and the subsequent process are repeated. When the determination result of step S7 is positive, the FLUTE stream delivery process ends.

According to the above-described FLUTE stream delivery process, when the fragmented MP4 (the segment stream) is FLUTE-multicast-delivered, the smaller file transmission units can be sequentially transmitted. Thus, when the image quality of content and the bit rate of fragmented MP4s increase in the future, it is possible to suppress the supply of the file transmission unit from being delayed. Moreover, it is possible to prevent the situation in which the delay causes the buffering start time of the terminal device 70 to be delayed and thus reproduction of content having a real-time property is negatively affected.

By the way, each of the content supply device 60 and the terminal device 70 that execute a series of processes described above can be configured with hardware or can be implemented by executing software through a computer. Examples of the computer include a computer embedded in dedicated hardware and a general-purpose personal computer capable of installing various kinds of programs and executing various kinds of functions.

Figure 13:
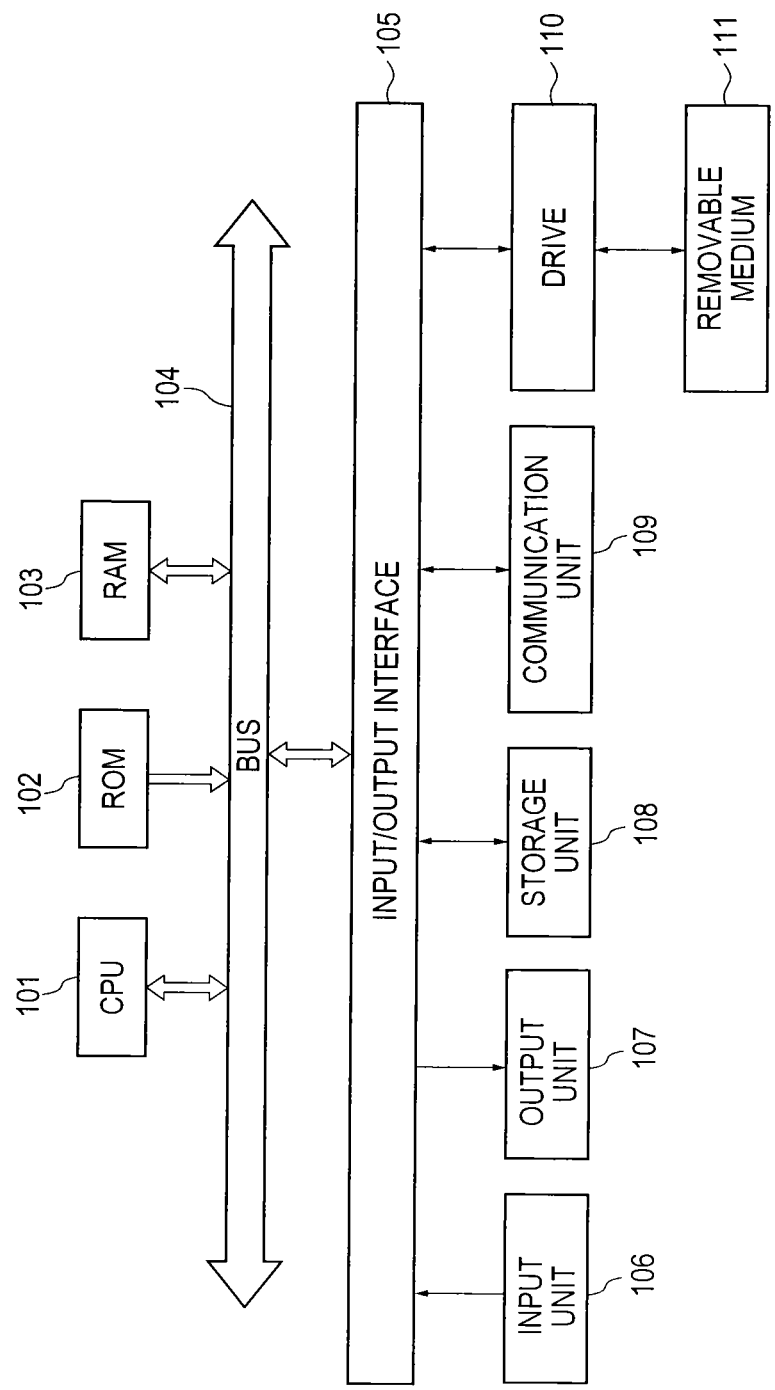
FIG. 13 is a block diagram illustrating an exemplary configuration of a computer.

FIG. 13 is a block diagram illustrating an exemplary hardware configuration of the computer.

In a computer 100, a central processing unit (CPU) 101, a read only memory (ROM) 102, and a random access memory (RAM) 103 are connected with one another via a bus 104.

An input/output interface 105 is connected to the bus 104. An input unit 106, an output unit 107, a storage unit 108, a communication unit 109, and a drive 110 are connected to the input/output interface 105.

The input unit 106 includes a keyboard, a mouse, a microphone, and the like. The output unit 107 includes a display, a speaker, and the like. The storage unit 108 includes a hard disk, a non-volatile memory, and the like. The communication unit 109 includes a network interface. The drive 110 drives a removable medium 111 such as a magnetic disk, an optical disk, a magneto-optical disk, or a semiconductor memory.

In the computer 100 having the above-described configuration, for example, a series of processes described above are performed by loading a program stored in the storage unit 108 onto the RAM 103 through the input/output interface 105 and the bus 104 and executing the loaded program through the CPU 101.

For example, the program executed by the computer 100 (the CPU 101) may be recorded in the removable medium 111 serving as a package medium or the like and provided. The program may be provided via a wired or wireless transmission medium such as a local area network, the Internet, or digital satellite broadcasting.

In the computer 100, the removable medium 111 may be mounted on the drive 110, and the program may be installed in the storage unit 108 through the input/output interface 105. The program may be received by the communication unit 109 via a wired or wireless transmission medium and installed in the storage unit 108. Moreover, the program may be installed in the ROM 102 or the storage unit 108 in advance.

Further, the program executed by the computer 100 may be a program in which a process is chronologically performed according to the sequence described in the present specification or may be a program in which a process is performed in parallel or at a necessary timing, for example, when calling is performed.

An embodiment of the present disclosure is not limited to the above embodiments, and various changes can be made within the scope not departing from the gist of the present disclosure.

Additionally, the present technology may also be configured as below.

(1)

A content supply device that multicast-delivers a fragment stream of content, the content supply device including:

a fragment stream generating unit configured to generate the fragment stream based on source data of the content; and a delivering unit configured to generate a file transmission unit in units of second data units by delimiting the generated fragment stream into first data units that are randomly accessible and subdividing the first data unit into the second data units and FLUTE-multicast-deliver the file transmission unit.

(2)

The content supply device according to (1), wherein the delivering unit generates the file transmission unit that includes moof in which a version attribute is added to the second data unit of the first data unit of the fragment stream and mdat in which data of the second data unit is stored.

(3)

The content supply device according to (1) or (2), wherein the delivering unit generates the file transmission unit that includes moof in which styp, a version attribute, and ntpt are added to the second data unit at a head of the first data unit of the fragment stream and mdat in which data of the second data unit is stored, and wherein the delivering unit generates the file transmission unit including moof and mdat for another second data unit different from the second data unit at the head of the first data unit.

(4)

The content supply device according to (3), wherein the delivering unit stores a numerical value indicating a version of moof in the version attribute, and stores NTP Time-1 corresponding to BaseMediaDecodeTime-1 of the second data unit at the head of the first data unit in the ntpt.

(5)

The content supply device according to (4), wherein the delivering unit generates moof of the file transmission unit corresponding to the other second data unit different from the second data unit at the head by copying and updating the moof including the version attribute and the ntpt of the file transmission unit that is previously generated.

REFERENCE SIGNS LIST 50 content supply system
51 network
52 NTP server
60 content supply device
61 channel streamer
62 DASH segmenter
63 FLUTE streamer
64 MPD generator
65 web server
66 multicast server
70 terminal device
100 computer
101 CPU

The invention claimed is:

1. A content supply device comprising:
processing circuitry configured to:
generate a stream of a content based on source data of the content;
delimit the stream into first data units, each of the first data units corresponding to a respective group of pictures (GOP) of the content, the respective GOP being randomly accessible;
divide one of the first data units into second data units, the one of the first data units being decodable by a receiver after the receiver receives all the second data units;
generate file transmission units based on the second data units, respectively; and
deliver the generated file transmission units using a unidirectional transport protocol,
wherein one of the file transmission units includes time information indicating a presentation time for samples in the one of the file transmission units.

2. The content supply device according to claim 1, wherein the one of the file transmission units includes:
a media data field configured to store a particular second data unit of the one of the first data units; and
a content fragment field including a header, the header including
a sequence number attribute indicating an ordinal position of the one of the first data units with respect to all the first data units of the stream, and
a version attribute indicating an ordinal position of the particular second data unit with respect to all the second data units of the one of the first data units.

3. The content supply device according to claim 2, wherein, when the ordinal position of the particular second data unit is first,
the one of the file transmission units further includes segment type information indicating a type of the one of the file transmission units, and
the content fragment field of the one of the file transmission units further includes the time information indicating an NTP time corresponding to a presentation time of the particular second data unit.

4. The content supply device according to claim 2, wherein
another one of the file transmission units includes another content fragment field that is a copy of the content fragment field of the one of the file transmission units except for the version attribute of the content fragment field.

5. A method comprising:
generating, by processing circuitry, a stream of a content based on source data of the content;

delimiting the stream into first data units, each of the first data units corresponding to a respective group of pictures (GOP) of the content, the respective GOP being randomly accessible;

dividing one of the first data units into second data units, the one of the first data units being decodable by a receiver after the receiver receives all the second data units;

generating file transmission units based on the second data units, respectively; and delivering the generated file transmission units using a unidirectional transport protocol, wherein one of the file transmission units includes time information indicating a presentation time for samples in the one of the file transmission units.

6. A non-transitory computer-readable storage medium having embedded therein instructions, which when executed by one or more processors, cause the one or more processors to:

generate a stream of a content based on source data of the content;

delimit the stream into first data units, each of the first data units corresponding to a respective group of pictures (GOP) of the content, the respective GOP being randomly accessible;

divide one of the first data units into second data units, the one of the first data units being decodable by a receiver after the receiver receives all the second data units;

generate file transmission units based on the second data units, respectively; and deliver the generated file transmission units using a unidirectional transport protocol, wherein one of the file transmission units includes time information indicating a presentation time for samples in the one of the file transmission units.

7. A receiving device comprising:
processing circuitry configured to
receive, using a unidirectional transport protocol, file transmission units respectively carrying second data units, the second data units being generated by delimiting a stream representing a content into first data units that respectively correspond to groups of pictures (GOPs) of the content and subdividing one of the first data units into the second data units, the GOPs being randomly accessible;

perform buffering of the file transmission units corresponding to the one of the first data units;

decode the one of the first data units after all the second data units are received; and reproduce one of the randomly accessible GOPs of the content based on the one of the first data units, wherein one of the file transmission units includes time information indicating a presentation time for samples in the one of the file transmission units.

8. A content supply system comprising:
a content supply device; and
a receiving device,
wherein the content supply device includes first processing circuitry configured to:
generate a stream of a content based on source data of the content;
delimit the stream into first data units, each of the first data units corresponding to a respective group of pictures (GOP) of the content, the respective GOP being randomly accessible;

divide one of the first data units into second data units, the one of the first data units being decodable by a receiver after the receiver receives all the second data units;

generate file transmission units based on the second data units, respectively; and deliver the generated file transmission units using a unidirectional transport protocol, and wherein the receiving device includes second processing circuitry configured to:
receive, using the unidirectional transport protocol, the file transmission units;
perform buffering of the file transmission units corresponding to the one of the first data units;
decode the one of the first data units after all the second data units are received; and
reproduce one of the randomly accessible GOPs of the content based on the one of the first data units, wherein one of the file transmission units includes time information indicating a presentation time for samples in the one of the file transmission units.

9. The receiving device according to claim 7, wherein the one of the file transmission units includes:
a media data field configured to store a particular second data unit of the one of the first data units; and
a content fragment field including a header, the header including
a sequence number attribute indicating an ordinal position of the one of the first data units with respect to all the first data units of the stream, and
a version attribute indicating an ordinal position of the particular second data unit with respect to all the second data units of the one of the first data units.

10. The receiving device according to claim 9, wherein, when the ordinal position of the particular second data unit is first,
the one of the file transmission units further includes segment type information indicating a type of the one of the file transmission units, and
the content fragment field of the one of the file transmission units further includes the time information indicating an NTP time corresponding to a presentation time of the particular second data unit.

11. The receiving device according to claim 9, wherein another one of the file transmission units includes another content fragment field that is a copy of the content fragment field of the one of the file transmission units except for the version attribute of the content fragment field.

12. A method comprising:
receiving, using a unidirectional transport protocol, file transmission units respectively carrying second data units, the second data units being generated by delimiting a stream representing a content into first data units that respectively correspond to groups of pictures (GOPs) of the content and subdividing one of the first data units into the second data units, the GOPs being randomly accessible;

performing buffering of the file transmission units corresponding to the one of the first data units;

decoding, using processing circuitry, the one of the first data t s after all the second data units are received; and reproducing, using the processing circuitry, one of the randomly accessible GOPs of the content based on the one of the first data units, wherein one of the file transmission units includes time information indicating a presentation time for samples in the one of the file transmission units.

13. The method according to claim 12, wherein the one of the file transmission units includes:
 a media data field configured to store a particular second data unit of the one of the first data units; and
 a content fragment field including a header, the header including
  a sequence number attribute indicating an ordinal position of the one of the first data units with respect to all the first data units of the stream, and
  a version attribute indicating an ordinal position of the particular second data unit with respect to all the second data units of the one of the first data units.

14. The method according to claim 13, wherein, when the ordinal position of the particular second data unit is first,
 the one of the file transmission units further includes segment type information indicating a type of the one of the file transmission units, and
 the content fragment field of the one of the file transmission units further includes the time information indicating an NTP time corresponding to a presentation time of the particular second data unit.

15. The method according to claim 13, wherein
another one of the file transmission units includes another content fragment field that is a copy of the content fragment field of the one of the file transmission units except for the version attribute of the content fragment field.

16. A non-transitory computer-readable storage medium having embedded therein instructions, which when executed by one or more processors, cause the one or more processors to:
 receive, using a unidirectional transport protocol, file transmission units respectively carrying second data units, the second data units being generated by delimiting a stream representing a content into first data units that respectively correspond to groups of pictures (GOPs) of the content and subdividing one of the first data units into the second data units, the GOPs being randomly accessible;
 perform buffering of the file transmission units corresponding to the one of the first data units;
 decode the one of the first data units after all the second data units are received; and
 reproduce one of the randomly accessible GOPs of the content based on the one of the first data units
 wherein one of the file transmission units includes time information indicating a presentation time for samples in the one of the file transmission units.

17. The method according to claim 5, wherein one of the file transmission units includes:
 a media data field configured to store a particular second data unit of the one of the first data units; and
 a content fragment field including a header, the header including
  a sequence number attribute indicating an ordinal position of the one of the first data units with respect to all the first data units of the stream, and
  a version attribute indicating an ordinal position of the particular second data unit with respect to all the second data units of the one of the first data units.

18. The method according to claim 17, wherein, when the ordinal position of the particular second data unit is first,
 the one of the file transmission units further includes segment type information indicating a type of the one of the file transmission units, and
 the content fragment field of the one of the file transmission units further includes the time information indicating an NTP time corresponding to a presentation time of the particular second data unit.

* * * * *